United States Patent [19]

Helton

[11] Patent Number: 4,835,899

[45] Date of Patent: * Jun. 6, 1989

[54] FISHING LURE WITH TEMPERATURE RESPONSIVE COLOR CHANGE

[76] Inventor: Doyle D. Helton, 448 Shepard Rd., Xenia, Ohio 45385

[ * ] Notice: The portion of the term of this patent subsequent to Mar. 22, 2005 has been disclaimed.

[21] Appl. No.: 169,823

[22] Filed: Mar. 18, 1988

Related U.S. Application Data

[63] Continuation of Ser. No. 68,578, Jul. 1, 1987, Pat. No. 4,731,948.

[51] Int. Cl.⁴ .............................................. A01K 85/00
[52] U.S. Cl. .................................. 43/42.33; 43/42.53
[58] Field of Search ............. 43/42.33, 4, 17.6, 42.06, 43/42.53, 42.32

[56] References Cited

U.S. PATENT DOCUMENTS

| 1,626,264 | 12/1926 | Cressey | 43/42.33 |
| 2,333,484 | 11/1943 | Miles | 43/42.33 |
| 3,763,588 | 10/1973 | Foster | 43/4 |
| 3,935,659 | 2/1976 | McCallum | 43/17.6 |
| 4,283,876 | 8/1981 | Volenec | 43/42.33 |
| 4,610,103 | 9/1986 | Iteinman | 43/42.33 |
| 4,676,020 | 6/1987 | Taylor et al. | 43/42.06 |

Primary Examiner—Nicholas P. Godici
Assistant Examiner—Karen Skillman
Attorney, Agent, or Firm—Jacox & Meckstroth

[57] ABSTRACT

A fishing lure has a member or body which is at least partially covered with a first coating of a dark adhesive material, and the first coating is overlaid with a second coating of a binder combined with temperature sensitive encapsulated liquid crystals. The second coating is overlaid with a third coating of clear sealant material, and the third coating may be decorated or painted to simulate the eyes, scales or fins of a miniature fish.

16 Claims, 1 Drawing Sheet

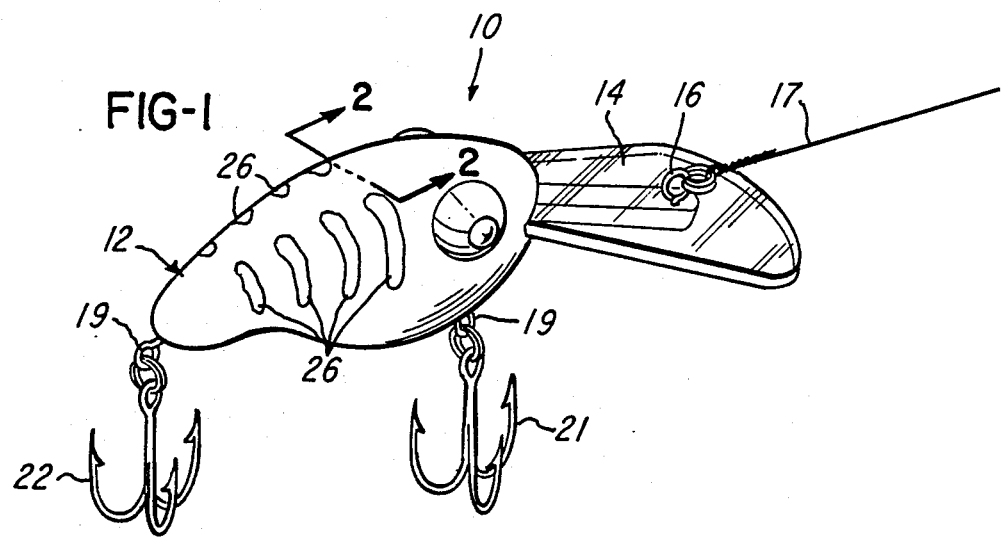
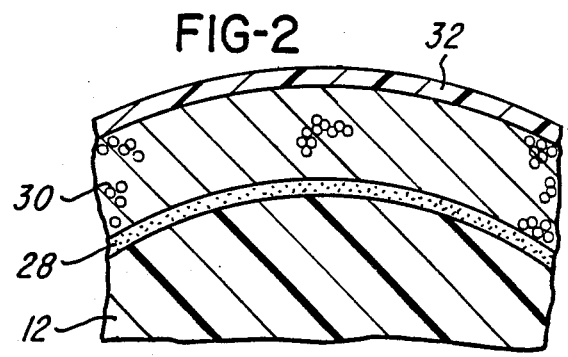
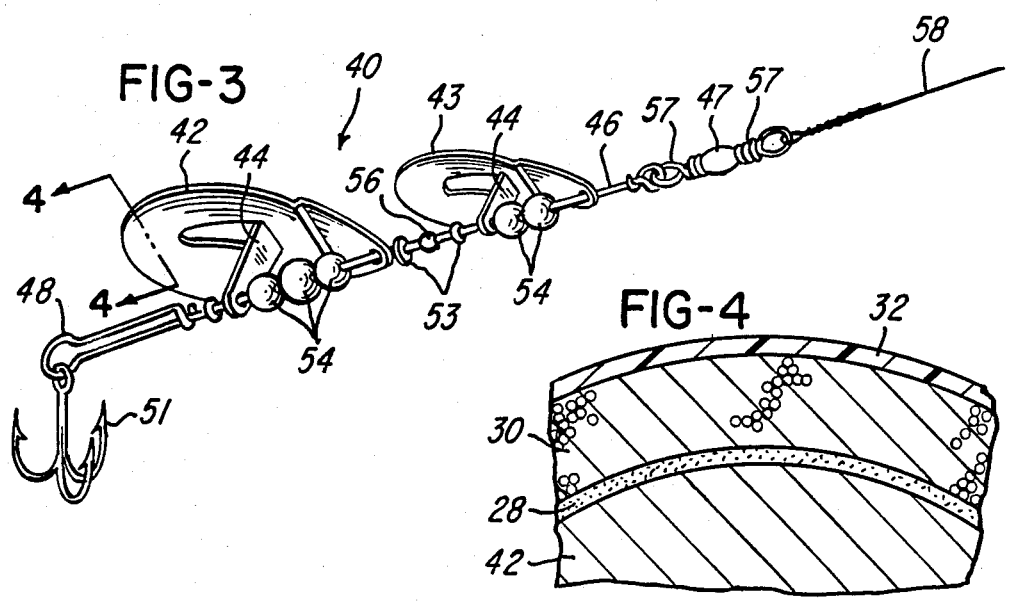
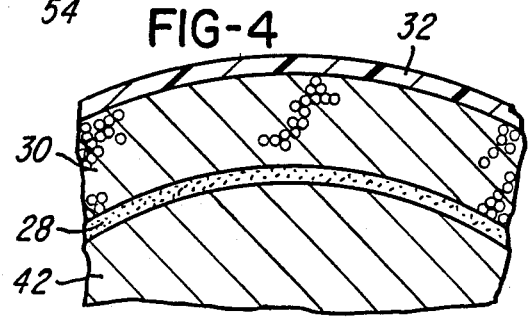

FISHING LURE WITH TEMPERATURE RESPONSIVE COLOR CHANGE

RELATED APPLICATION

This application is a continuation of application Ser. No. 68,578, filed July 1, 1987, U.S. Pat. No. 4,731,948.

BACKGROUND OF THE INVENTION

In the art of fishing lures, it has been known or proposed to coat an outer surface of the lure with a special light reflecting material such as luminous paint or pigment as disclosed in U.S. Pat. No. 1,612,264 or a phosphorescent material such as disclosed in U.S. Pat. No. 3,935,659. Fishing lures have also been constructed or proposed with a body of transparent plastics material which encloses a special light reflecting material, for example, as disclosed in U.S. Pat. No. 2,333,484 and U.S. Pat. No. 3,763,588. In the latter patent, the lure body encloses a temperature responsive fluid which undergoes expansion and contraction upon being exposed to variations in temperature and to indicate the temperature of the water surrounding the lure body. It has also been found that certain fish are more attracted to specific colors, and thus the fishing lures have been made with a wide variety of colors and designs, some of which simulate a miniature fish or minnow.

SUMMARY OF THE INVENTION

The present invention is directed to a novel fishing lure having an outer surface which changes color in response to changes in temperature of the water through which the lure is pulled. Preferably, the color produced within a particular temperature range or band is the color which provides the greatest attraction to the fish that normally travel or swim in water within the temperature band.

In accordance with one embodiment of the invention, a fishing lure in the form of a hard body plug, carries a coating of thermally responsive liquid crystals which are bonded to the plug body by an adhesive coating and are overlaid by a coating of substantially clear water-resistant material to protect the liquid crystals from direct exposure to the water. The hard body plug is then painted or decorated, for example, with simulated eyes, fins and/or scales of a bug or miniature fish. After the decorating, suitable eyelets and multiple hooks are attached to the plug body. In another embodiment, the fishing lure body is formed by a sheet metal spinner element which is coated in the same manner as the hard body plug.

Other features and advantages of the invention will be apparent from the following description, the accompanying drawing and the appended claims.

BRIEF DESCRIPTION OF THE DRAWING

FIG. 1 is a perspective view of a fishing lure constructed in accordance with the invention;

FIG. 2 is a greatly enlarged fragmentary section taken generally on the line 2—2 of FIG. 1;

FIG. 3 is a perspective view of another form of fishing lure constructed in accordance with the invention; and FIG. 4 is a greatly enlarged fragmentary section taken generally on the line 4—4 of FIG. 3.

DESCRIPTION OF THE PREFERRED EMBODIMENTS

FIG. 1 illustrates a fishing lure 10 which includes a hard body plug 12 having the general configuration and appearance of a miniature fish. Preferably, the body 12 is molded of rigid plastics material, and a transparent molded plastic vane or lip 14 projects from the mouth area of the body. An eyelet 16 is attached or screwed into the lip 14 for securing a flexible fishing line 17, and a pair of eyelets 19 are threaded into the body 12 for attaching a set of three prong hook elements 21 and 22. The body 12 has projections 24 which are decorated with eye simulating colors, and a series of cross marks or bands 26 simulate fish scales. The lip 14 is effective to maintain the lure below the water surface when the lure is pulled through the water.

In accordance with the present invention, the entire outer surface of the molded plastic body 12 is coated with an adhesive or bonding layer 28 (FIG. 2). Preferably, the coating or layer 28 consists of a mixture of a water-based ink and a liquid adhesive to provide the layer 28 with a dark color such as brown, blue or black. One adhesive mixture which has provided satisfactory results consist of WIT 800 water-based ink mixed with an acrylic ester copolymer sold by Rohm & Haas Company uner the trademark RHOPLEX N-495. The adhesive coating or layer 28 is relatively thin, for example, with a thickness of approximately 0.001 inch. The layer 28 may be applied by dipping the body 12 within the liquid mixture or by spraying the mixture onto the body from a spray nozzle.

After the coating or layer 28 is dry, a second coating or layer 30, consisting of a mixture of a binder, such as polyvinyl alcohol, and a slurry of micro-encapsulated liquid crystals, is applied over the layer 28 by dipping or spraying. Preferably, the micro-encapsulated liquid crystals are formed by mixing various proportions of encapsulated cholesteric esters including cholesteryl nonawate, cholesteryl proprionate and cholesteryl isosteryl carbonate. The esters are preferably encapsulated by the gel and gum arabic method. The gelatin is available from Dynagel in Chicago, the polyvinyl alcohol is available from DuPont in Delaware, and the cholesteric esters are available from Pressure Chemical Company in Pittsburg.

After the layer 30 has dried, it is covered or overlayed with a coating or layer 32 of clear waterproof sealant material such as a crystal clear acrylic enamel or a clear lacquer. After the coating or layer 32 is dried, the decorative paints are applied over the coating 32 to form the eyes 24 and scales 26. The layer 32 has a thickness of about 0.001 inch.

The temperature sensitive or responsive micro-encapsulated liquid crystals within the coating or layer 30 are formulated to change color within a temperature range from about 34° F. to 90° F. Preferably, the range of colors produced by the liquid crystals include the colors of blue, red, green, blackish-gray and milky-white. The coating or layer 30 has a thickness from 0.004 to 0.006 inch, and two layers 30 or a double coating may be used if desired. The coating or layer 28 provides a dark base or background surface to provide a contrast for the various colors produced when the layer or coating 30 changes in color as the lure 10 changes temperature with the changes in the temperature of the water surrounding the lure.

Referring to FIGS. 3 and 4 which show a modification of the invention, a fishing lure 40 in the form of a spinner-type lure, includes a set of spoon-shaped bodies or spinner elements 42 and 43 each of which has a lanced tab or ear 44 and is supported for spinning or orbital movement by an elongated wire 46. One end portion of the wire 46 is formed into an eyelet 47, and the opposite end of the wire forms a releasable U-shaped loop 48 for receiving a multiple hook element 51. The spinner bodies or elements 42 and 43 are each formed of sheet metal and are spaced on the wire 46 between a set of slidable rings 53 and decorative beads 54 separated by a fixed bead 56. A swivel element 57 connects the eyelet 47 to a flexible fishing line 58.

In accordance with the present invention, each of the metal spinner bodies or elements 42 and 43 has an outer surface coated with a bonding layer 28, a layer 30 of liquid crystal material and an overlay coating or layer 32 of clear water-proof sealant or protective material, such as the lacquer or acrylic enamel mentioned above.

From the drawing and the above description, it is apparent that a fishing lure constructed in accordance with the present invention, provides desirable features and advantages. As a primary feature, the body of the fishing lure changes through a range of colors in response to changes in temperature of the water surrounding the fishing lure. Preferably, the liquid crystals are formulated so that the color of the lure for a specific temperature range, is the color which provides the greatest attraction to a fish which normally swims in the water within the temperature range. The changing color of the fishing lure body with changes in the surrounding water temperature also provides the lure with a more animated appearance in order to provide greater attraction to the fish.

While the forms of fishing lures herein described constitute preferred embodiments of the invention, it is to be understood that the invention is not limited to these precise forms of fishing lures, and that changes may be made therein without departing from the scope and spirit of the invention as defined in the appended claims.

The invention having thus been described, the following is claimed:

1. A fishing lure comprising a body having an outer surface forming a predetermined configuration, means for connecting a flexible fishing line to said body for pulling said body through the water, at least one hook connected to said body, means associated with said body for maintaining said body below the water surface when the body is pulled through the water by the fishing line, a layer of thermally responsive liquid crystal material covering at least a portion of said body, said liquid crystal material being effective to change in color in response to changes in temperature of the water which receives the fishing lure, means for attaching said layer of liquid crystal material to said body, and means for protecting said liquid crystal material from contact by the water.

2. A fishing lure as defined in claim 1 wherein said liquid crystal material changes color within a water temperature range of between 34° F. and 90° F.

3. A fishing lure as defined in claim 1 wherein said body comprises a solid plug body having generally the configuration of a miniature fish, and decorative paint-like material on said layer to simulate components of a miniature fish.

4. A fishing lure as defined in claim 1 wherein said body comprises a sheet metal spinner element, and means supporting said sheet metal element for revolving movement in response to pulling the fishing lure through the water.

5. A fishing lure as defined in claim 1 wherein said liquid crystal material is encapsulated.

6. A fishing lure as defined in claim 5 wherein said encapsulated liquid crystal material comprises a mixture of esters of cholesteryl nonawate, cholesteryl proprionate and cholesteryl carbonate.

7. A fishing lure as defined in claim 1 wherein said protecting means comprise a layer of clear material.

8. A fishing lure as defined in claim 1 wherein said means for attaching said layer of liquid crystal material comprise a mixture of a copolymer and a water-based ink.

9. A fishing lure comprising a body having an outer surface forming a predetermined configuration, means for connecting a flexible fishing line to said body for pulling said body through the water, at least one hook connected to said body, means associated with said body for maintaining said body below the water surface when the body is pulled through the water by the fishing line, a first layer of bonding material covering at least a portion of said body, a second layer of thermally responsive liquid crystal material covering at least a portion of said first layer, said liquid crystal material being effective to change in color in response to changes in temperature of the water which receives the fishing lure, and means for protecting said second layer of liquid crystal material from contact by the water.

10. A fishing lure as defined in claim 9 wherein said body comprises a solid plug body having the general configuration of a miniature fish, and a paint-like material for decorating said body.

11. A fishing lure as defined in claim 9 wherein said body comprises a sheet metal spinner element, and a wire element supporting said sheet metal element for revolving movement in response to pulling the fishing lure through the water.

12. A fishing lure as defined in claim 9 wherein said liquid crystal material is encapsulated.

13. A fishing lure as defined in claim 9 wherein said first layer comprises a mixture of a copolymer and a water-based ink.

14. A method of making a fishing lure comprising the steps of forming a body having an outer surface with a predetermined configuration, providing the body with means for connecting a flexible fishing line for pulling the body through the water and for maintaining the body below the water surface, forming a slurry of liquid crystal material which changes in color in response to changes in temperature of the material, attaching a layer of the thermally responsive liquid crystal material to at least a portion of the body, and providing the layer with means to protect the material from contact by the water.

15. A method as defined in claim 14 wherein the body comprises a solid plug body, and applying decorative paint-like material on the body.

16. A method as defined in claim 14 wherein the step of attaching the layer comprises coating the portion of the body with a mixture of a liquid adhesive and a water-based ink.

* * * * *